UNITED STATES PATENT OFFICE.

CABELL WHITEHEAD, OF WASHINGTON, DISTRICT OF COLUMBIA.

PROCESS OF EXTRACTING GOLD FROM ORES.

SPECIFICATION forming part of Letters Patent No. 641,818, dated January 23, 1900.

Application filed July 24, 1899. Serial No. 724,964. (No specimens.)

*To all whom it may concern:*

Be it known that I, CABELL WHITEHEAD, of Washington, District of Columbia, have invented a new and useful Improvement in Processes of Extracting Gold from Ores, of which the following is a specification.

My invention relates to an improved process for extracting gold from ores; and it consists in the novel features hereinafter fully described, and particularly pointed out in the claims at the end of this specification.

This invention has for its object the extraction of gold by cyaniding from those quartz ores in which the metallic gold occurs intimately associated with the hydrated oxids of the base metals, as aluminium or iron, or with the carbonates of the alkali earths. In this type of ores the metallic gold is intimately associated or intermixed with the hydrated oxids or with the carbonates in such manner that these salts form a film, coating, or envelop on the particles of the metallic gold, which prevents the cyanid solution from coming in contact with the gold particles. Thus when the ore is crushed even to one hundred and twenty mesh and treated with the cyanid solution the gold particles are so protected by their coating that only about fifty per cent. of the gold can be acted upon by the cyanid and brought into solution. This class of ores can be readily worked by subjecting them to the action of a dilute acid, as HCl, and in this way removing the protecting-coating before their treatment with the cyanid solution; but such process is so expensive as to prohibit its use on a commercial scale. In this class of ores the gold occurs in the quartz so intimately associated or mixed with the above-specified salts that no method of extraction by cyanid has been devised suitable for use in a plant. These ores occur, as far as known, only in a single locality in this country and differ physically and chemically from the common "clayey" ores. In the clayey ores the gold occurs in a free state eminently suitable for its ready solution in cyanid, the difficulty in working these ores being the imperviousness of the clayey slimes, which prevents the percolation of the liquid containing the gold in solution.

My improved process consists in the extraction of gold from quartz ores in which the gold particles are intimately associated or mixed with a hydrated oxid of a base metal or with the carbonates of the alkali earths by, first, subjecting the crushed ore to a heat sufficient to drive off the water of hydration or the $CO_2$, and, second, then treating the ore thus prepared with a cyanid solution. In the step of heating, the water of hydration or the $CO_2$ probably begins to be driven off at 250° Fahrenheit and is all removed at a temperature below a red heat. This treatment causes the film intimately mixed in the gold particles to become friable and places all the gold in condition to be readily attacked by the cyanid solution.

In the second step of my process I subject the ore prepared by the first step to a cyanid solution of any well-known or desired strength. This class of ores permits the ready percolation of the cyanid solution, and when treated by my process the solution comes into intimate contact with every particle of the gold.

By my process I am enabled to extract from eighty-five per cent. to ninety-five per cent. of the value of the gold contained in the ore when working on a commercial scale, while in the method at present employed less than fifty per cent. of the value of the gold is obtained.

Having thus described my invention, what I claim as new, and desire to secure by Letters Patent, is—

1. The process of extracting gold from ores in which it occurs enveloped in an oxidized compound of a base metal which is practically impervious to a solvent solution, such as one of cyanid, and not readily removable by washing with water, consisting in first subjecting the crushed ore to heat sufficient to convert the coating into a porous condition and afterward treating the ore with a cyanid solution.

2. The process of extracting gold from ores in which it occurs enveloped in an oxidized compound of a base metal which is practically impervious to a solvent solution, such as one of cyanid, not readily removable by washing with water, and insoluble in water but soluble in dilute acids, consisting in subjecting the crushed ore to heat sufficient to convert the coating into a porous condition and afterward treating the ore with a cyanid solution.

3. The process of extracting gold from ores in which the particles of free gold are enveloped in a compound of a base metal having the following characteristics, to wit: non-silicious, oxidized, practically impervious to a solvent solution, such as one of cyanid, not readily removable by washing with water, and insoluble in water but soluble in dilute acids, consisting in first subjecting the crushed ore to the action of heat sufficient to convert the coating into a porous condition and afterward treating the ore with a cyanid solution.

4. The process of extracting gold from ores in which it occurs enveloped in a hydrated oxid of a base metal which is practically impervious to a solvent solution, such as one of cyanid, and not readily removable by washing with water, consisting in subjecting the crushed ore to heat sufficient to convert the coating into a porous condition and afterward treating the ore with a cyanid solution.

In testimony whereof I hereunto set my hand, this 24th day of July, 1899, in the presence of two attesting witnesses.

CABELL WHITEHEAD.

Witnesses:
  JAS. T. ALSTON,
  JAS. N. FITZPATRICK.